United States Patent
Chada et al.

(10) Patent No.: US 9,954,576 B2
(45) Date of Patent: Apr. 24, 2018

(54) SYSTEM AND METHOD FOR PAM-4 TRANSMITTER BIT EQUALIZATION FOR IMPROVED CHANNEL PERFORMANCE

(71) Applicant: DELL PRODUCTS, LP, Round Rock, TX (US)

(72) Inventors: Arun R. Chada, Round Rock, TX (US); Bhyrav M. Mutnury, Round Rock, TX (US); Jiayi He, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 25 days.

(21) Appl. No.: 15/274,579

(22) Filed: Sep. 23, 2016

(65) Prior Publication Data
US 2018/0091189 A1    Mar. 29, 2018

(51) Int. Cl.
  *H04L 27/00* (2006.01)
  *H04B 3/04* (2006.01)
  *H04L 25/03* (2006.01)

(52) U.S. Cl.
  CPC ......... *H04B 3/04* (2013.01); *H04L 25/03343* (2013.01); *H04L 25/03878* (2013.01)

(58) Field of Classification Search
  CPC .................................................. H04L 27/2627
  See application file for complete search history.

(56) References Cited

U.S. PATENT DOCUMENTS

| | | | |
|---|---|---|---|
| 9,148,198 | B1 | 9/2015 | Zhang et al. |
| 9,337,993 | B1 * | 5/2016 | Lugthart ............... H04L 7/033 |
| 2005/0089126 | A1 | 4/2005 | Zerbe et al. |
| 2015/0085914 | A1 | 3/2015 | Kizer et al. |
| 2015/0256363 | A1 | 9/2015 | Shvydun et al. |
| 2016/0149730 | A1 | 5/2016 | Navid |

* cited by examiner

*Primary Examiner* — Shuwang Liu
*Assistant Examiner* — Gina McKie
(74) *Attorney, Agent, or Firm* — Larson Newman, LLP (57) ABSTRACT

A method includes receiving a serial data stream at a transmitter of a serial channel, encoding the serial data stream using a quaternary pulse amplitude modulation (PAM-4) scheme into a stream of 2-bit symbols, wherein a particular symbol is represented as a signal at one of four signal levels provided for a unit interval of time, determining that a first symbol of the encoded serial data stream is represented as a highest state of the PAM-4 scheme, and, in response, providing a first output signal on an output of the transmitter, wherein the first output signal includes a first portion at a first voltage level associated with the highest state for a first half of a first unit interval of time associated with the first symbol, followed by a second portion at a second voltage level associated with a de-emphasized highest state of the PAM-4 scheme for a second half of the first unit interval of time.

20 Claims, 5 Drawing Sheets

SYSTEM AND METHOD FOR PAM-4 TRANSMITTER BIT EQUALIZATION FOR IMPROVED CHANNEL PERFORMANCE

FIELD OF THE DISCLOSURE

This disclosure generally relates to information handling systems, and more particularly relates to PAM-4 transmitter bit equalization for improved channel performance in a high speed serial interface.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

SUMMARY

As the performance of high speed serial interfaces increases, multi-level signaling schemes such as quaternary pulse amplitude modulation (PAM-4) signaling will be increasingly common. However, a high speed serial interface that utilizes PAM-4 signaling may present greater signal integrity challenges that would be the case for two-level signaling.

A method can include receiving a serial data stream at a transmitter of a serial channel. The serial data stream can be encoded using a PAM-4 scheme into a stream of 2-bit symbols. A particular symbol can be represented as a signal at one of four signal levels provided for a unit interval of time. A first symbol of the encoded serial data stream can be determined to represent a highest state of the PAM-4 scheme. In response to determining that the first symbol of the encoded serial data stream represents the highest state of the PAM-4 scheme, an output signal can be provided on an output of the transmitter. The output signal can include a first portion at a first voltage level associated with the highest state for a first half of a first unit interval of time associated with the first symbol, followed by a second portion at a second voltage level associated with a de-emphasized highest state of the PAM-4 scheme for a second half of the first unit interval of time.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
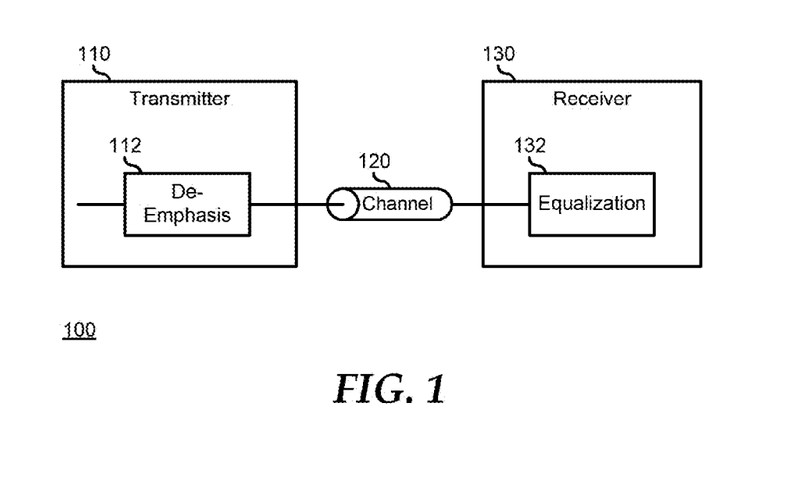
FIG. 1 is a block diagram illustrating a high speed serial channel according to an embodiment of the present disclosure.

FIG. 1 illustrates an embodiment of a high speed serial channel 100 of an information handling system. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Serial channel 100 includes a transmitter (TX) 110, a transmission channel 120, and a receiver (RX) 130. Serial channel 100 represents one half of a bi-directional serial data link for communicating data from transmitter 110 located at a first component to receiver 130 located at a second component. The other half of the bi-directional serial data link is similar to serial channel 100, but with a receiver in the first component, and a transmitter in the second component, for communicating data back from the second component to the first component. Here, the components can be understood to include elements within an information handling system, such as components that are attached to one or more printed circuit board of the information handling system, where transmission channel 120 can represent one or more circuit traces on the printed circuit board, and can include one or more connectors. The components can also be understood to include devices of an information handling system, such as a hard drive, a storage array, and the like, that are separate from the printed circuit board of the information handling system, where transmission channel 120 can include one or more transmission cables. An example of serial channel 100 may include a PCI-Express (PCIe) channel that is in compliance with an advanced PCIe specification, up to, and beyond the PCIe 9.0 Specification, a Serial ATA (SATA) channel that is in compliance with one or more SATA specification, up to, and beyond the SATA 3.2 Specification, an Ethernet channel including a 1000BASE-T channel, or beyond, or another high speed serial channel.

Serial channel 100 operates to provide back channel adaptation where transmitter 110 and receiver 130 communicate with each other to optimize and adjust various compensation values within the transmitter and the receiver to compensate for the insertion loss and cross-talk on transmission channel 120. A determination is made as to whether or not a set of compensation values is satisfactory based upon a determination of the bit error rate (BER) associated with the set of values. It is possible for multiple different sets of compensation values to result in acceptable BER in serial channel 100. Thus, when a particular set of compensation values is obtained through the back channel adaptation, serial channel 100 further operates to adjust the particular set of compensation values to lower the settings of compensation mechanisms that are known to consume a greater amount of power, and to adjust other mechanisms to correct for the lowered settings, thereby reducing the power consumption of serial channel 100, while maintaining an acceptable BER.

Transmitter 110 includes de-emphasis hardware 112. In operation, serial data is provided to de-emphasis hardware 112, and the de-emphasis hardware operates to provide a reduction in the signal levels of the serial data after a first data bit is transmitted, in order to de-emphasize the subsequent data bits and to transmit the de-emphasized serial data to receiver 130 via transmission channel 120. The amount of de-emphasis is determined based upon a de-emphasis setting. For example, transmitter 110 can support 21 de-emphasis settings which each prescribe a different amount of de-emphasis, from 0 dB to 10 dB, in 0.5 dB steps. Other numbers of settings and amounts of de-emphasis prescribed by the de-emphasis setting can be utilized, as needed or desired. The de-emphasis provided by de-emphasis hardware 112 operates to reduce the signal level of subsequent bits in a bit stream after a state transition in the signal, in order to de-emphasize the low frequency content of the serial data signal, thereby compensating for losses over channel 130 which may be greater for the higher frequency content in the serial data signal, thereby providing a better equalized serial data signal at receiver 130.

Receiver 130 includes equalization hardware 132. In operation, the de-emphasized serial data is received by equalization module 132, and the equalization module provides compensation to the received signal in order to open the signal eye of the received signal. The compensation can include continuous time linear equalization (CTLE) to improve inter-signal interference (ISI), automatic gain control (AGC) to provide linear gain, decision feedback equalization (DFE), or other compensation in order to open the signal eye of the received signal, as needed or desired. The amount of compensation is determined based upon an various equalization settings. For example, receiver 130 can support 21 equalization settings which each prescribe a different amount of equalization, from 0 dB to 10 dB, in 0.5 dB steps. Other numbers of settings and amounts of equalization prescribed by the equalization setting can be utilized, as needed or desired.

Serial channel 100 operates based upon different communication speed settings that are each characterized by a different data rate. For example, where serial channel 100 represents a PCIe serial link, serial link may be operable at 250 mega-bytes per second (MB/s), 500 MB/s, 1 giga-bytes per second (GB/s), or 2 GB/s or faster. Further, each communication speed setting is associated with a particular line encoding scheme. For example, different communication speed settings can provide for different encodings of the received serial data on the serial channel, such as an 8-bit-10-bit encoding where eight (8) bits of serial data are encoded as ten (10) bits transmitted on transmission channel 120, or a 128-bit-130-bit encoding where 128 bits of serial data are encoded as 130 bits transmitted on the transmission channel. Such encodings operate to ensure clock synchronization between transmitter 110 and receiver 130.

Figure 2:
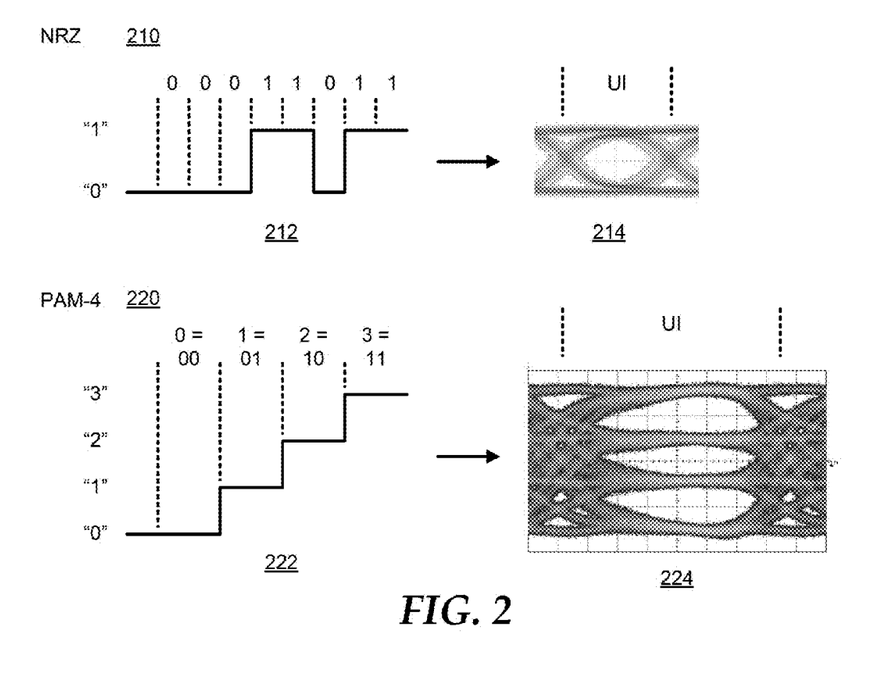
FIG. 2 illustrates signal level encoding schemes that can be implemented on the high speed serial channel of FIG. 1.

Each communication speed setting is further associated with a particular signal level encoding scheme, as shown in FIG. 2. In a first signal level encoding scheme 210, a binary (or two-level) non-return-to-zero (NRZ) encoding, the data signal transmitted on transmission channel 120 can have one of two different signal levels. Here, a digital "0" is encoded as a low state of the transmitted signal, and a digital "1" is encoded as a high state of the signal. A bit stream 212 as transmitted in binary-NRZ encoding illustrates the signal levels for the stream of serial data "0, 0, 0, 1, 1, 0, 1, 1." Eye diagram 214 is typical of a data signal transmitted using binary-NRZ encoding. In another encoding scheme 220, a quaternary (or four-level) pulse amplitude modulation (PAM-4) encoding, the data signal transmitted on transmission channel 120 can have one of four different signal levels that each encode a particular 2-bit symbol. Here, the 2-bit sequence "00" is encoded as a low level, state "0," of the transmitted signal, the 2-bit sequence "01" is encoded as a first higher level, state "1," of the transmitted signal, the 2-bit sequence "10" is encoded as a next higher level, state "3," of the transmitted signal, and the 2-bit sequence "11" is encoded as a highest level, state "4," of the transmitted signal. A bit stream 222 as transmitted in PAM-4 encoding illustrates the signal levels "0, 1, 2, 3," for data stream 212, that is, the stream of serial data "0, 0, 0, 1, 1, 0, 1, 1." Eye diagram 224 is typical of a data signal transmitted using PAM-4 encoding. Note that where a particular signal level encoding scheme utilizes PAM-4 encoding, the clock rate of serial channel 100 may be half the clock rate of the a binary NRZ scheme and can still transmit the same amount of data because two bits of data are transmitted with each clock pulse. As such, PAM-4 encoding that operates at the same clock rate as a binary NRZ scheme has the potential to transmit twice the data as the binary NRZ scheme. Thus PAM-4 encoding is particularly suitable to higher bandwidth data transmission standards. Note that the 2-bit sequence encoding described above represents a particular embodiment, and that other mappings of the various 2-bit sequences onto the state levels of the PAM-4 encoding may be utilized as needed or desired.

Figure 3:
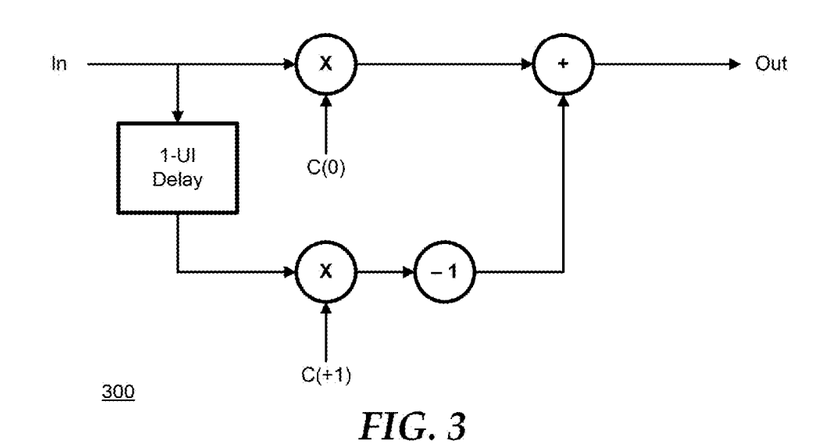
FIG. 3 is a block diagram of a transfer function for a quaternary pulse amplitude modulation (PAM-4) scheme on the high speed serial channel of FIG. 1 according to an embodiment of the present disclosure.

FIG. 3 illustrates a transfer function 300 for transmitter 110 that provides de-emphasis for PAM-4 encoding schemes. In particular, transfer function 300 implements a feed forward equalization (FFE) scheme where de-emphasis is provided on each subsequent symbols after a first symbol is transmitted. Here, a serial data stream is inputted to transfer function 300 as a stream of data symbols. In a first clock pulse, denoted as a first unit interval (UI), a first order compensation level, C(0), is provided to a first data symbol, and the first data symbol is also provided to a delay unit that delays further operations on the first data symbol by 1-UI. In a second clock pulse, the first order compensation level, C(0), is provided to a second data symbol and a second order compensation level, C(+1), is provided to the delayed first data symbol. The compensated delayed first data symbol is added to the compensated second data symbol to provide an output from transfer function 300.

Figure 4:
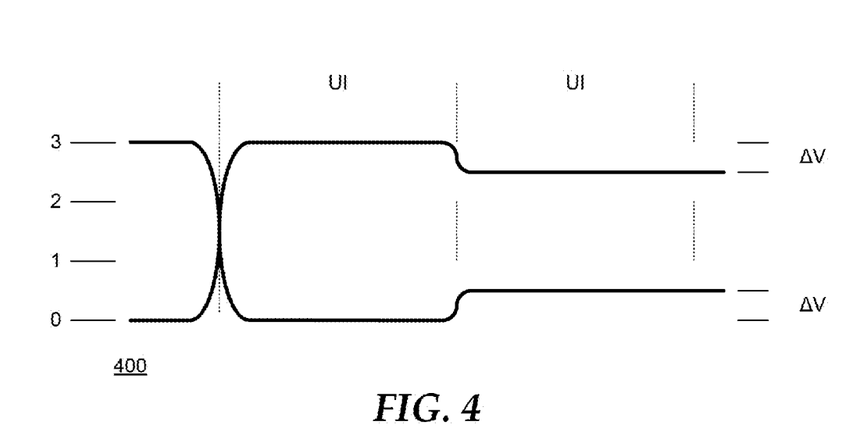
FIG. 4 is a state change diagram for the PAM-4 scheme of FIG. 3.
Figure 5:
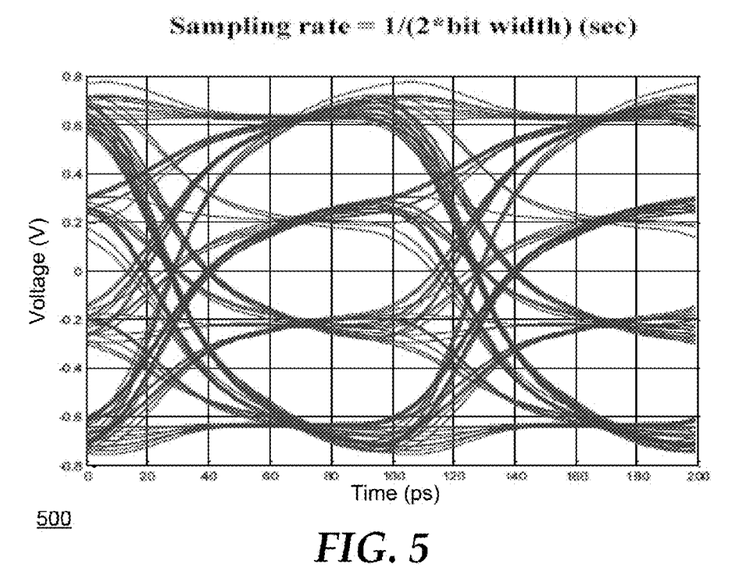
FIG. 5 is an eye diagram for the PAM-4 scheme of FIG. 3.

In this way, the serial data signal for each subsequent data symbol that has a same logical value as a first data symbol that represents a state change from a previous data symbol, is de-emphasized, as is shown the state change diagram 400 of FIG. 4. Thus, where a first data symbol is a "3," and the signal level is provided at the "3" state signal level, then subsequent "3" state symbols will be provided at a reduced "3" state signal level. Here, the difference between the initial "3" state signal level and the subsequent "3" state signal level is shown as AV, which represents a change in voltage from the initial state to the subsequent state. Similarly, where a first data symbol is a "0," and the signal level is provided at the "0" state signal level, then subsequent "0" state symbols will be provided at an increased "0" state signal level. Again, the difference between the initial "0" state signal level and the subsequent "0" state signal level is shown as AV. Note that as shown in FIG. 4, the magnitude of AV is exaggerated for the purposes of illustration. In a particular embodiment, transmitter 110 supports 21 de-emphasis, C(+1), settings which each prescribe a different amount of de-emphasis, from 0 dB to 10 dB, in 0.5 dB steps. Other numbers of settings and amounts of de-emphasis prescribed by the de-emphasis setting can be utilized, as needed or desired. FIG. 5 shows an eye diagram 500 associated with transfer function 300 and state change diagram 400. Note that, where the bit stream provides for a transition from any lower state to the "3" state that is immediately followed by a transition back to a lower will not be de-emphasized in a PAM-4 encoding scheme that utilizes transfer function 300.

Figure 6:
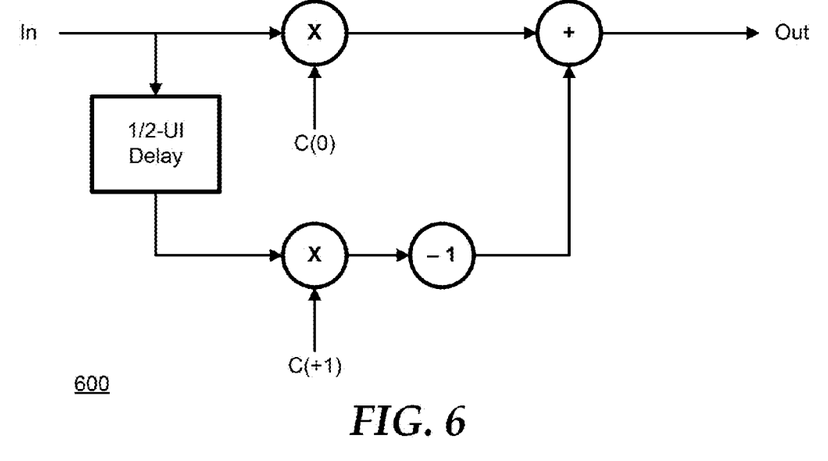
FIG. 6 is a block diagram of a transfer function for a quaternary pulse amplitude modulation (PAM-4) scheme on the high speed serial channel of FIG. 1 according to another embodiment of the present disclosure.

FIG. 6 illustrates a transfer function 600 for transmitter 110 that provides a different de-emphasis for PAM-4 encoding schemes. In particular, transfer function 500 implements a feed forward equalization (FFE) scheme where de-emphasis is provided on a per-bit basis within a first symbol and for each subsequent symbols after the first symbol is transmitted. Here, a serial data stream is inputted to transfer function 500 as a stream of data symbols. In a first clock pulse, denoted as a first unit interval (UI), a first order compensation level, C(0), is provided to a first data symbol, and the first data symbol is also provided to a delay unit that delays further operations on the first data symbol by one half UI (½-UI), a second order compensation level, C(+½), is provided to the delayed first data symbol, and the compensated delayed first data symbol is added to the initially compensated first data symbol to provide an output from transfer function 500.

Figure 7:
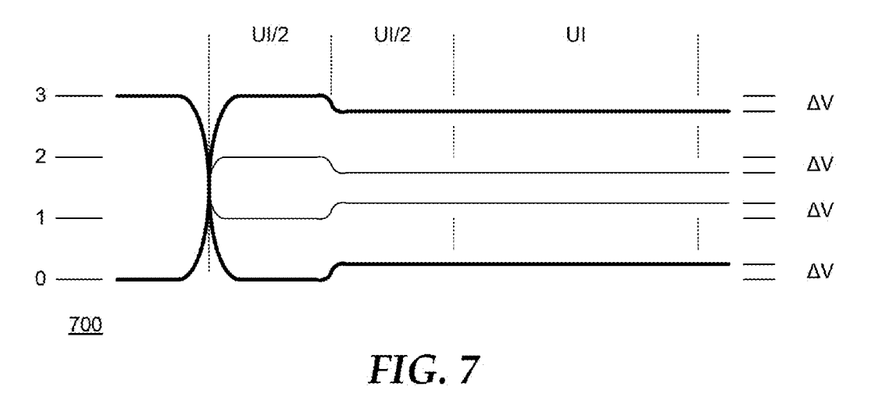
FIG. 7 is a state change diagram for the PAM-4 scheme of FIG. 6.

In this way, the serial data signal for each subsequent data symbol that has a same logical value as a first data symbol that represents a state change from a previous data symbol, is de-emphasized one half UI early, as is shown in the state change diagram 700 of FIG. 7. Thus, where a data symbol represents a first transition to the "3" state and the signal level is provided at the "3" state signal level, then half way through a clock cycle, the de-emphasis is add, and also all subsequent "3" state symbols will be provided at a reduced "3" state signal level. Here, the difference between the initial "3" state signal level and the subsequent "3" state signal level is shown as AV, which represents a change in voltage from the initial state to the subsequent state. Similarly, where a data symbol represents a first transition to the "0" state and the signal level is provided at the "0" state signal level, then half way through a clock cycle, the de-emphasis is added, and also all subsequent "0" state symbols will be provided at an increased "0" state signal level. Again, the difference between the initial "0" state signal level and the subsequent "0" state signal level is shown as AV. Note that as shown in FIG. 7, the magnitude of AV is exaggerated for the purposes of illustration. In a particular embodiment, transmitter 110 supports 21 de-emphasis, C(+1), settings which each prescribe a different amount of de-emphasis, from 0 dB to 10 dB, in 0.5 dB steps. Other numbers of settings and amounts of de-emphasis prescribed by the de-emphasis setting can be utilized, as needed or desired. In this way, the equalization of transmitter 110 and the transfer function of transmission channel 120 and becomes more linear without increasing resonance, resulting in a more uniform signal eye and greater signal margin at receiver 130.

Note that where a particular symbol represents a first transition to either the "3" state or the "0" state, the determination of the state of any follow-on symbols may be deemed to be unnecessary to the maintaining of the de-emphasis, since any symbol that follows a "3" state can only be another "3" state or a lower state, and any symbol that follows a "0" state can only be another "0" state or a higher state. Thus in another embodiment, an equivalent system to the de-emphasis provided by transfer function 600 is provided by simply determining if a particular symbol represents either a "0" state or a "3" state, and if so, then providing de-emphasis at the ½-UI time. In a particular embodiment, as shown in FIG. 7, where a data symbol represents a first transition to the "2" state and the signal level is provided at the "2" state signal level, then half way through a clock cycle, a de-emphasis is add, and also all subsequent "2" state symbols will be provided at a reduced "2" state signal level. Here, the difference between the initial "2" state signal level and the subsequent "2" state signal level is shown as AV, which represents a change in voltage from the initial state to the subsequent state. Similarly, where a data symbol represents a first transition to the "1" state and the signal level is provided at the "1" state signal level, then half way through a clock cycle, the de-emphasis is added, and also all subsequent "1" state symbols will be provided at an increased "1" state signal level. Again, the difference between the initial "1" state signal level and the subsequent "1" state signal level is shown as ΔV. It will be understood that the use of the notation ΔV is not necessarily correlated to a single voltage level value, and that the de-emphasis coefficients for each of levels 0, 1, 2, and 3 can be different, as needed or desired to provide an optimized eye diagram.

Figure 8:
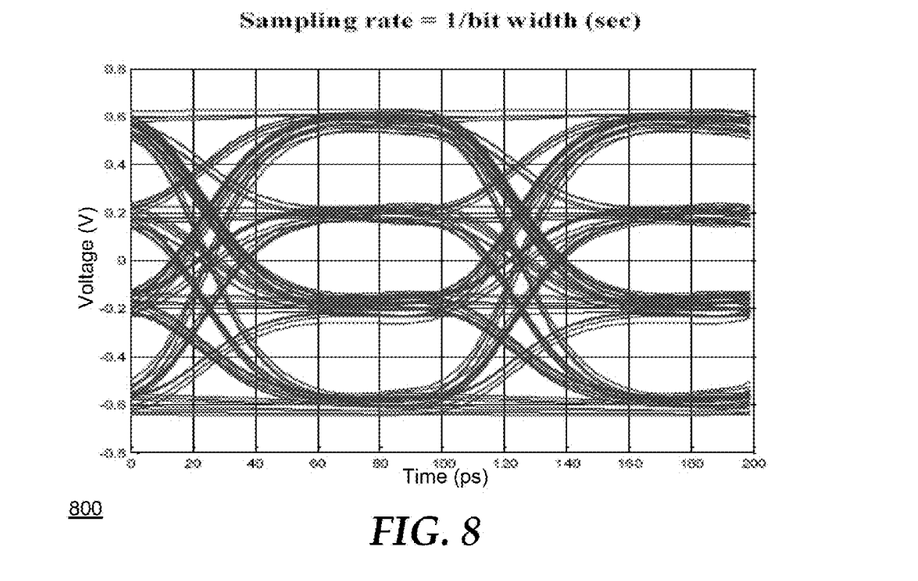
FIG. 8 is an eye diagram for the PAM-4 scheme of FIG. 6.

FIG. 8 shows an eye diagram 800 associated with transfer function 600 and state change diagram 700. Note that eye diagram 800 shows where the implementation of transfer function 600 results in better top eye and bottom eye margins in the resulting signal than is the case for the implementation of transfer function 300, as shown by eye diagram 500.

Figure 9:
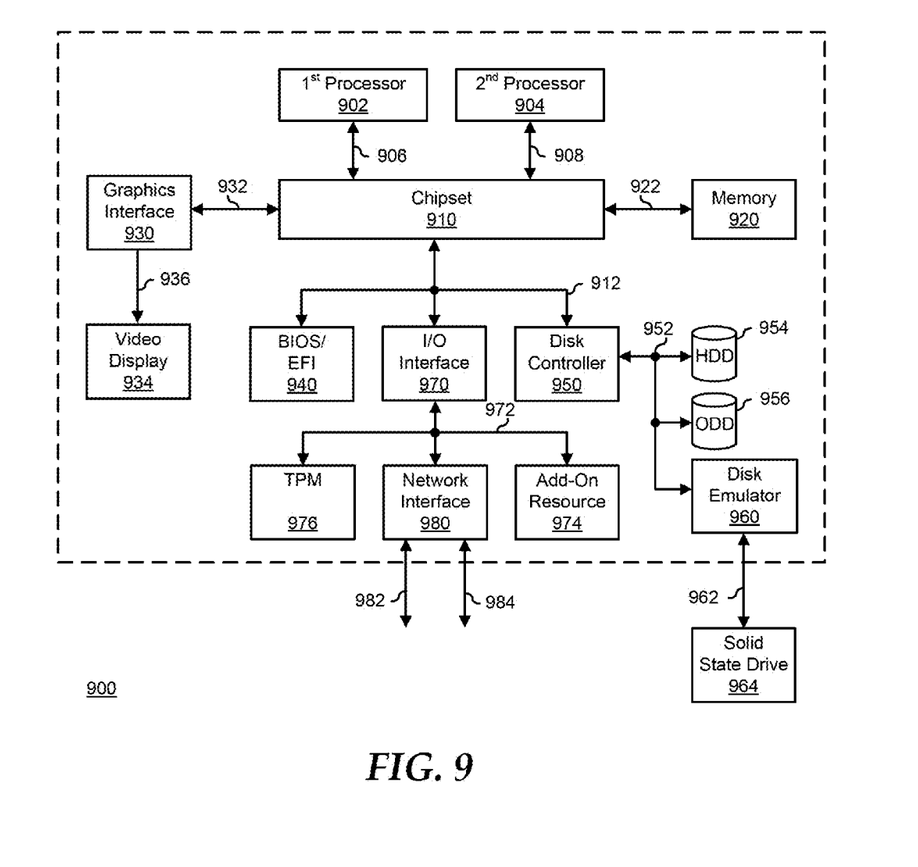
FIG. 9 is a block diagram illustrating a generalized information handling system according to an embodiment of the present disclosure.

FIG. 9 illustrates a generalized embodiment of information handling system 900. For purpose of this disclosure information handling system 900 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 900 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 900 can include processing resources for executing machine-executable code, such as a central processing unit (CPU), a programmable logic array (PLA), an embedded device such as a System-on-a-Chip (SoC), or other control logic hardware. Information handling system 900 can also include one or more computer-readable medium for storing machine-executable code, such as software or data. Additional components of information handling system 900 can include one or more storage devices that can store machine-executable code, one or more communications ports for communicating with external devices, and various input and output (I/O) devices, such as a keyboard, a mouse, and a video display. Information handling system 900 can also include one or more buses operable to transmit information between the various hardware components.

Information handling system 900 can include devices or modules that embody one or more of the devices or modules described above, and operates to perform one or more of the methods described above. Information handling system 900 includes a processors 902 and 904, a chipset 910, a memory 920, a graphics interface 930, include a basic input and output system/extensible firmware interface (BIOS/EFI) module 940, a disk controller 950, a disk emulator 960, an input/output (I/O) interface 970, and a network interface 980. Processor 902 is connected to chipset 910 via processor interface 906, and processor 904 is connected to the chipset via processor interface 908. Memory 920 is connected to chipset 910 via a memory bus 922. Graphics interface 930 is connected to chipset 910 via a graphics interface 932, and provides a video display output 936 to a video display 934. In a particular embodiment, information handling system 900 includes separate memories that are dedicated to each of processors 902 and 904 via separate memory interfaces. An example of memory 920 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 940, disk controller 950, and I/O interface 970 are connected to chipset 910 via an I/O channel 912. An example of I/O channel 912 includes a Peripheral Component Interconnect (PCI) interface, a PCI-Extended (PCI-X) interface, a high speed PCI-Express (PCIe) interface, another industry standard or proprietary communication interface, or a combination thereof. Chipset 910 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 940 includes BIOS/EFI code operable to detect resources within information handling system 900, to provide drivers for the resources, initialize the resources, and access the resources. BIOS/EFI module 940 includes code that operates to detect resources within information handling system 900, to provide drivers for the resources, to initialize the resources, and to access the resources.

Disk controller 950 includes a disk interface 952 that connects the disc controller to a hard disk drive (HDD) 954, to an optical disk drive (ODD) 956, and to disk emulator 960. An example of disk interface 952 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 960 permits a solid-state drive 964 to be connected to information handling system 900 via an external interface 962. An example of external interface 962 includes a USB interface, an IEEE 1394 (Firewire) interface, a proprietary interface, or a combination thereof. Alternatively, solid-state drive 964 can be disposed within information handling system 900.

I/O interface 970 includes a peripheral interface 972 that connects the I/O interface to an add-on resource 974, to a TPM 976, and to network interface 980. Peripheral interface 972 can be the same type of interface as I/O channel 912, or can be a different type of interface. As such, I/O interface 970 extends the capacity of I/O channel 912 when peripheral interface 972 and the I/O channel are of the same type, and the I/O interface translates information from a format suitable to the I/O channel to a format suitable to the peripheral channel 972 when they are of a different type. Add-on resource 974 can include a data storage system, an additional graphics interface, a network interface card (NIC), a sound/video processing card, another add-on resource, or a combination thereof. Add-on resource 974 can be on a main circuit board, on separate circuit board or add-in card disposed within information handling system 900, a device that is external to the information handling system, or a combination thereof.

Network interface 980 represents a NIC disposed within information handling system 900, on a main circuit board of the information handling system, integrated onto another component such as chipset 910, in another suitable location, or a combination thereof. Network interface device 980 includes network channels 982 and 984 that provide interfaces to devices that are external to information handling system 900. In a particular embodiment, network channels 982 and 984 are of a different type than peripheral channel 972 and network interface 980 translates information from a format suitable to the peripheral channel to a format suitable to external devices. An example of network channels 982 and 984 includes InfiniBand channels, Fibre Channel channels, Gigabit Ethernet channels, proprietary channel architectures, or a combination thereof. Network channels 982 and 984 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   receiving, at a transmitter of a serial channel, a serial data stream;
   encoding the serial data stream using a quaternary pulse amplitude modulation (PAM-4) scheme into a stream of 2-bit symbols, wherein a particular symbol is represented as a signal at one of four signal levels provided for a unit interval of time;
   determining that a first symbol of the encoded serial data stream is represented as a highest state of the PAM-4 scheme; and
   in response to determining that the first symbol is represented as the highest state, providing a first output signal on an output of the transmitter, wherein the first output signal includes a first portion at a first voltage level associated with the highest state for a first half of a first unit interval of time associated with the first symbol, followed by a second portion at a second voltage level associated with a de-emphasized highest state of the PAM-4 scheme for a second half of the first unit interval of time.

2. The method of claim 1, further comprising:
   determining that a second symbol of the encoded serial data stream is represented as a lowest state of the PAM-4 scheme; and
   in response to determining that the second symbol is represented as the lowest state, providing a second output signal on the output, wherein the second output signal comprises a third portion at a third voltage level associated with the lowest state for a first half of a second unit interval of time associated with the second symbol, followed by a fourth portion at a fourth voltage level associated with a de-emphasized lowest state of the PAM-4 scheme for a second half of the second unit interval of time.

3. The method of claim 1, wherein:
   a first symbol represents a bit sequence comprising a digital 0 followed by a digital 0, and is represented in the PAM-4 scheme by a lowest state;
   a second symbol represents a bit sequence comprising a digital 0 followed by a digital 1, and is represented in the PAM-4 scheme by a first higher state, wherein the first higher state is higher than the lowest state;
   a third symbol represents a bit sequence comprising a digital 1 followed by a digital 0, and is represented in the PAM-4 scheme by a second higher state, wherein the second higher state is higher than the first higher state; and
   a fourth symbol represents a bit sequence comprising a digital 1 followed by a digital 1, and is represented in the PAM-4 scheme by a highest state, wherein the highest state is higher than the second higher state.

4. The method of claim 1, further comprising:
   sending the output signal to a receiver via a transmission channel.

5. The method of claim 4, further comprising:
   equalizing, at the receiver, the output signal; and
   decoding the output signal to recover the serial data stream.

6. The method of claim 1, wherein the de-emphasized highest state comprises one of 20 de-emphasis levels, each de-emphasis level prescribing a different amount of de-emphasis.

7. The method of claim 6, wherein the different amounts of de-emphasis comprise de-emphasis levels 0.5 dB to 10 dB, in 0.5 dB steps.

8. The method of claim 1, wherein the transmitter comprises a transmitter of a PCI-e link.

9. A serial data channel, comprising:
   a transmitter; and
   a receiver configured to receive an output signal from the transmitter;
   the transmitter configured to:
     receive a serial data stream;
     encode the serial data stream using a quaternary pulse amplitude modulation (PAM-4) scheme into a stream of 2-bit symbols, wherein a particular symbol is represented as a signal at one of four signal levels provided for a unit interval of time;
     determine that a first symbol of the encoded serial data stream is represented as a highest state of the PAM-4 scheme; and
     in response to determining that the first symbol is represented as the highest state, provide a first output signal on an output of the transmitter, wherein the first output signal includes a first portion at a first voltage level associated with the highest state for a first half of a first unit interval of time associated with the first symbol, followed by a second portion at a second voltage level associated with a de-emphasized highest state of the PAM-4 scheme for a second half of the first unit interval of time.

10. The serial data channel of claim 9, the transmitter further configured to:
    determine that a second symbol of the encoded serial data stream is represented as a lowest state of the PAM-4 scheme; and
    in response to determining that the second symbol is represented as the lowest state, provide a second output signal on the output, wherein the second output signal comprises a third portion at a third voltage level associated with the lowest state for a first half of a second unit interval of time associated with the second symbol, followed by a fourth portion at a fourth voltage level associated with a de-emphasized lowest state of the PAM-4 scheme for a second half of the second unit interval of time.

11. The serial data channel of claim 9, wherein:
a first symbol represents a bit sequence comprising a digital 0 followed by a digital 0, and is represented in the PAM-4 scheme by a lowest state;
a second symbol represents a bit sequence comprising a digital 0 followed by a digital 1, and is represented in the PAM-4 scheme by a first higher state, wherein the first higher state is higher than the lowest state;
a third symbol represents a bit sequence comprising a digital 1 followed by a digital 0, and is represented in the PAM-4 scheme by a second higher state, wherein the second higher state is higher than the first higher state; and
a fourth symbol represents a bit sequence comprising a digital 1 followed by a digital 1, and is represented in the PAM-4 scheme by a highest state, wherein the highest state is higher than the second higher state.

12. The serial data channel of claim 9, the transmitter further configured to:
send the output signal to the receiver via a transmission channel.

13. The serial data channel of claim 12, the receiver configured to:
equalize the output signal; and
decode the output signal to recover the serial data stream.

14. The serial data channel of claim 9, wherein the de-emphasized highest state comprises one of 20 de-emphasis levels, each de-emphasis level prescribing a different amount of de-emphasis.

15. The serial data channel of claim 14, wherein the different amounts of de-emphasis comprise de-emphasis levels 0.5 dB to 10 dB, in 0.5 dB steps.

16. The serial data channel of claim 9, wherein the serial data channel comprises a PCI-e link.

17. A non-transitory computer-readable medium including code for performing a method, the method comprising:
receiving, at a transmitter of a serial channel, a serial data stream;
encoding the serial data stream using a quaternary pulse amplitude modulation (PAM-4) scheme into a stream of 2-bit symbols, wherein a particular symbol is represented as a signal at one of four signal levels provided for a unit interval of time;
determining that a first symbol of the encoded serial data stream is represented as a highest state of the PAM-4 scheme; and
in response to determining that the first symbol is represented as the highest state, providing a first output signal on an output of the transmitter, wherein the first output signal includes a first portion at a first voltage level associated with the highest state for a first half of a first unit interval of time associated with the first symbol, followed by a second portion at a second voltage level associated with a de-emphasized highest state of the PAM-4 scheme for a second half of the first unit interval of time.

18. The computer-readable medium of claim 17, the method further comprising:
determining that a second symbol of the encoded serial data stream is represented as a lowest state of the PAM-4 scheme; and
in response to determining that the second symbol is represented as the lowest state, providing a second output signal on the output, wherein the second output signal comprises a third portion at a third voltage level associated with the lowest state for a first half of a second unit interval of time associated with the second symbol, followed by a fourth portion at a fourth voltage level associated with a de-emphasized lowest state of the PAM-4 scheme for a second half of the second unit interval of time.

19. The computer-readable medium of claim 17, wherein:
a first symbol represents a bit sequence comprising a digital 0 followed by a digital 0, and is represented in the PAM-4 scheme by a lowest state;
a second symbol represents a bit sequence comprising a digital 0 followed by a digital 1, and is represented in the PAM-4 scheme by a first higher state, wherein the first higher state is higher than the lowest state;
a third symbol represents a bit sequence comprising a digital 1 followed by a digital 0, and is represented in the PAM-4 scheme by a second higher state, wherein the second higher state is higher than the first higher state; and
a fourth symbol represents a bit sequence comprising a digital 1 followed by a digital 1, and is represented in the PAM-4 scheme by a highest state, wherein the highest state is higher than the second higher state.

20. The computer-readable medium of claim 17, the method further comprising:
sending the output signal to a receiver via a transmission channel.

* * * * *